United States Patent
Shibuya et al.

(10) Patent No.: US 11,112,550 B2
(45) Date of Patent: Sep. 7, 2021

(54) POLARIZING PLATE, OPTICAL APPARATUS AND METHOD OF MANUFACTURING POLARIZING PLATE

(71) Applicant: DEXERIALS CORPORATION, Tokyo (JP)

(72) Inventors: Kazuyuki Shibuya, Osaki (JP); Shigeshi Sakakibara, Tome (JP); Toshiaki Sugawara, Sendai (JP); Yusuke Matsuno, Tome (JP); Akio Takada, Sendai (JP)

(73) Assignee: Dexerials Corporation, Tokyo (JP)

( * ) Notice: Subject to any disclaimer, the term of this patent is extended or adjusted under 35 U.S.C. 154(b) by 0 days.

(21) Appl. No.: 16/640,609

(22) PCT Filed: Jul. 30, 2019

(86) PCT No.: PCT/JP2019/029863
§ 371 (c)(1),
(2) Date: Feb. 20, 2020

(87) PCT Pub. No.: WO2020/027144
PCT Pub. Date: Feb. 6, 2020

(65) Prior Publication Data
US 2020/0209451 A1 Jul. 2, 2020

(30) Foreign Application Priority Data
Jul. 31, 2018 (JP) .............................. JP2018-144093

(51) Int. Cl.
*G02B 5/30* (2006.01)
*G02F 1/1335* (2006.01)
*C09K 13/00* (2006.01)

(52) U.S. Cl.
CPC ............ *G02B 5/3058* (2013.01); *C09K 13/00* (2013.01); *G02F 1/133528* (2013.01); *G02F 1/133548* (2021.01)

(58) Field of Classification Search
CPC ............. G02B 5/3058; G02F 1/133528; G02F 2001/133548; C09K 13/00
(Continued)

(56) References Cited

U.S. PATENT DOCUMENTS

| 2009/0109377 A1 | 4/2009 | Sawaki et al. |
| 2014/0063467 A1 | 3/2014 | Takahashi et al. |

(Continued)

FOREIGN PATENT DOCUMENTS

| JP | 10012598 A | 1/1998 |
| JP | 2009109821 A | 5/2009 |

(Continued)

OTHER PUBLICATIONS

"International Application Serial No. PCT/JP2019/029863, International Search Report dated Oct. 8, 2019", (dated Oct. 8, 2019), 2 pgs.

(Continued)

*Primary Examiner* — George G King
(74) *Attorney, Agent, or Firm* — Schwegman Lundberg & Woessner, P.A.

(57) ABSTRACT

Provided is a polarizing plate that is a polarizing plate having a wire grid structure, and includes a transparent substrate and a plurality of protrusions that extend in a first direction on the transparent substrate and are periodically arranged at a pitch shorter than a wavelength of light in a use band. Each of the protrusions includes a reflective layer, a multilayer film, and an optical property improving layer located between the reflective layer and the multilayer film. The optical property improving layer contains an oxide that (Continued)

contains a constituent element of which the reflective layer is composed. An etching rate of the optical property improving layer with respect to a chlorine-based gas is no less than 6.7 times and no more than 15 times an etching rate of the multilayer film.

4 Claims, 5 Drawing Sheets

(58) Field of Classification Search
USPC .................................................. 359/485.05
See application file for complete search history.

(56) References Cited

U.S. PATENT DOCUMENTS

| | | |
|---|---|---|
| 2016/0161654 A1 | 6/2016 | Yeo et al. |
| 2017/0045658 A1* | 2/2017 | Kumai .................... G02B 5/003 |
| 2017/0148823 A1* | 5/2017 | Nam ..................... H01L 27/1218 |
| 2018/0299602 A1* | 10/2018 | Takeda ..................... G02B 5/30 |

FOREIGN PATENT DOCUMENTS

| | | | |
|---|---|---|---|
| JP | 2010135563 A | 6/2010 | |
| JP | 2010237437 A | 10/2010 | |
| JP | 2011054594 A | 3/2011 | |
| JP | 5333615 B2 | 1/2012 | |
| JP | 2012027221 A | 2/2012 | |
| JP | 2014052439 A | 3/2014 | |
| JP | 2015125252 A | 7/2015 | |
| WO | WO-2017073044 A1 * | 5/2017 | ....... G02F 1/133528 |

OTHER PUBLICATIONS

"International Application Serial No. PCT/JP2019/029863, Written Opinion dated Oct. 8, 2019", (dated Oct. 8, 2019), 4 pgs.

* cited by examiner

POLARIZING PLATE, OPTICAL APPARATUS AND METHOD OF MANUFACTURING POLARIZING PLATE

PRIORITY APPLICATIONS

This application is a U.S. National Stage Filing under 35 U.S.C. 371 from International Application No. PCT/JP2019/029863, filed on Jul. 30, 2019, and published as WO2020/027144 on Feb. 6, 2020, which claims the benefit of priority to Japanese Application No. 2018-144093, filed on Jul. 31, 2018; the benefit of priority of each of which is hereby claimed herein, and which applications and publication are hereby incorporated herein by reference in their entirety.

TECHNICAL FIELD

The present invention relates to a polarizing plate, an optical apparatus, and a method of manufacturing a polarizing plate.

Priority is claimed on Japanese Patent Application No. 2018-144093, filed Jul. 31, 2018, the contents of which are incorporated herein by reference.

BACKGROUND ART

Polarizing plates are used in liquid crystal displays and the like. In recent years, attention has been focused to wire grid polarizing plates in which reflective layers are arranged at intervals which are shorter than a wavelength of light in a use band.

The wire grid polarizing plates can be classified into reflection type polarizing plates and absorption type polarizing plates. For example, a reflection type wire grid polarizing plate in which metal thin wires having a rectangular sectional shape are arranged is disclosed in Patent Literature 1. In addition, an absorption type wire grid polarizing plate in which a dielectric layer and an absorption layer are formed on one surface of a reflective layer is disclosed in Patent Literature 2. Light reflected by the reflective layer and light reflected by the absorption layer are made to interfere with each other, and thereby cancel each other out.

The absorption type polarizing plate can reduce an amount of light reflected to a light outgoing side. Light reflected to a light outgoing side, for instance, in a liquid crystal projector or the like can be responsible for deterioration in image quality due to a malfunction of a liquid crystal panel and stray light.

On the other hand, the absorption type polarizing plate has a multilayer film, and is not easily processed. For example, a method of processing a multilayer film in the semiconductor field is described in Patent Literature 3. In Patent Literature 3, the multilayer film is processed by dry etching.

CITATION LIST

Patent Literature

[Patent Literature 1]
Japanese Unexamined Patent Application, First Publication No. 2010-237437
[Patent Literature 2]
Japanese Patent No. 5333615
[Patent Literature 3]
Japanese Unexamined Patent Application, First Publication No. 2010-135563

SUMMARY OF INVENTION

Technical Problem

The protrusions of a wire grid polarizing plate are manufactured at the nanometer scale. Further, an extinction ratio of the wire grid polarizing plate is dependent on a height of the reflective layer, and processing a structure having a high aspect ratio is required.

The present invention was made in view of the above problems and is directed to providing a method of manufacturing a polarizing plate having excellent optical properties, and a polarizing plate and an optical apparatus having excellent optical properties.

Solution to Problem

The present invention provides the following means to resolve the above problems.

A polarizing plate according to a first aspect is a polarizing plate having a wire grid structure, and includes: a transparent substrate; and a plurality of protrusions that extend in a first direction on the transparent substrate and are periodically arranged at a pitch shorter than a wavelength of light in a use band. Each of the protrusions includes a reflective layer, a multilayer film, and an optical property improving layer located between the reflective layer and the multilayer film. The optical property improving layer contains an oxide that contains a constituent element of which the reflective layer is composed. An etching rate of the optical property improving layer with respect to a chlorine-based gas is no less than 6.7 times and no more than 15 times an etching rate of the multilayer film.

In the polarizing plate according to the first aspect, the optical property improving layer may be formed of a material whose etching rate with respect to a fluorine-based gas is lower than that of the multilayer film.

In the polarizing plate according to the first aspect, the reflective layer may be formed of Al or Cu, and the optical property improving layer may be formed of an oxide of Al or Cu.

An optical apparatus according to a second aspect includes the polarizing plate according to the first aspect.

A method of manufacturing a polarizing plate according to a third aspect includes: a first laminating process of laminating a reflective layer on a transparent substrate; a layer forming process of heating the reflective layer and forming an optical property improving layer on a surface of the reflective layer which is located on a side opposite to the transparent substrate; a second laminating process of laminating a multilayer film and a mask layer in turn on the formed optical property improving layer; a pattern forming process of forming a mask pattern on the mask layer; a first processing process of processing the multilayer film via the mask pattern; and a second processing process of processing the optical property improving layer and the reflective layer using the multilayer film as a mask. The second processing process is performed with a chlorine-based gas, and an etching rate of the optical property improving layer with respect to the chlorine-based gas is no less than 6.7 times and no more than 15 times an etching rate of the multilayer film.

In the method of manufacturing a polarizing plate according to the third aspect, an etching rate of the reflective layer with respect to the chlorine-based gas may be set to no less than 6.7 times and no more than 15 times the etching rate of the multilayer film.

In the method of manufacturing a polarizing plate according to the third aspect, the mask layer may be made up of a plurality of layers; the mask layer may have a first mask layer, which is formed of the same material as the reflective layer, on the side closest to the substrate; the first mask layer may be processed with the chlorine-based gas in the pattern forming process; and an etching rate of the first mask layer with respect to the chlorine-based gas may be set to no less than 6.7 times and no more than 15 times the etching rate of the multilayer film.

In the method of manufacturing a polarizing plate according to the third aspect, the first processing process may be performed with a fluorine-based gas, and an etching rate of the optical property improving layer with respect to the fluorine-based gas may be set to no less than 0.22 times and no more than 0.39 times the etching rate of the multilayer film.

Advantageous Effects of Invention

In the method of manufacturing a polarizing plate according to the aspect, a polarizing plate having excellent optical properties can be manufactured. Further, in the polarizing plate and the optical apparatus according to the aspects, optical properties can be improved.

DESCRIPTION OF EMBODIMENTS

Hereinafter, the present embodiments will be described in detail with appropriate reference to the drawings. The drawings used in the following description may sometimes be drawn with specific portions enlarged to facilitate comprehension of the features of the present invention, and the dimensional ratios and the like between the constituent elements may differ from the actual values. The materials and dimensions and the like presented in the following description are merely examples, which in no way limit the present invention, and may be altered as appropriate within the scope of the present invention.

[Polarizing Plate]

Figure 1:
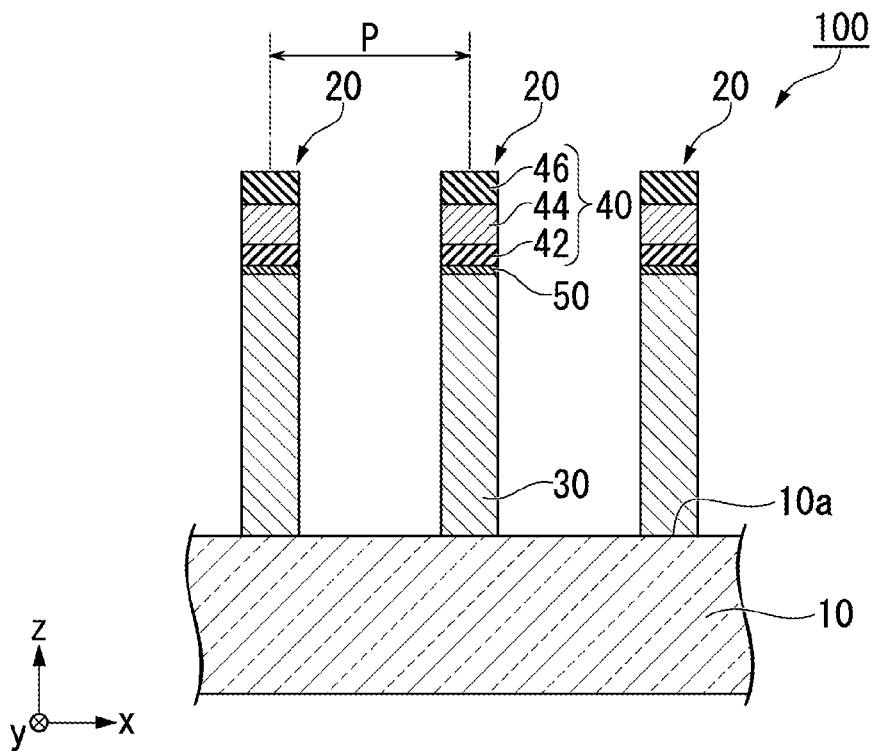
FIG. 1 is a cross-sectional schematic view of a polarizing plate according to a first embodiment.

FIG. 1 is a cross-sectional schematic view of a polarizing plate 100 according to a first embodiment. The polarizing plate 100 is a polarizing plate having a wire grid structure. The polarizing plate 100 includes a substrate 10 and a plurality of protrusions 20. In a top view, the plurality of protrusions 20 extend in a first direction. Hereinafter, a plane on which the substrate 10 extends is defined as an xy plane, and the first direction in which the plurality of protrusions 20 extend is defined as a y direction. Further, a direction perpendicular to the xy plane is defined as a z direction. FIG. 1 is a cross-sectional view obtained by cutting the polarizing plate 100 in an xz plane. In other words, FIG. 1 is a cross-sectional view perpendicular to the first direction in which the plurality of protrusions 20 extend.

The polarizing plate 100 attenuates a polarized wave (a TE wave (an S wave)) having an electric field component parallel to the y direction in which the protrusions 20 extend, and transmits a polarized wave (a TM wave (a P wave)) having an electric field component perpendicular to the y direction.

In the polarizing plate 100, the y direction is an absorption axis, and an x direction is a transmission axis.

(Substrate)

The substrate 10 has transparency for light having a wavelength in a use band of the polarizing plate 100. The expression "has transparency" does not necessarily mean that the substrate transmits 100% of the light of the wavelength in the use band, provided that sufficient light is transmitted to enable the functionality as a polarizing plate to be maintained. An average thickness of the substrate 10 is preferably 0.3 mm or more and 1 mm or less.

A material having a refractive index of 1.1 to 2.2 is preferably used for the substrate 10. For example, glass, quartz, sapphire, etc. can be used. A component composition of the glass material used as the substrate 10 is not particularly limited.

For example, silicate glass is widely available as optical glass, and is inexpensive. Further, quartz glass (having a refractive index of 1.46) and soda lime glass (having a refractive index of 1.51) have a low cost and have excellent transparency. In contrast, quartz and sapphire are excellent in thermal conductivity. The material of the substrate 10 can be appropriately selected depending on the performance required of the polarizing plate 100. For example, since a polarizing plate for an optical engine of a projector is irradiated with strong light, it is required to have light resistance and heat dissipation. For this reason, quartz and sapphire are preferably used for the substrate 10.

A shape of a first surface 10a of the substrate 10 is not limited to a flat surface. The first surface 10a of the substrate 10 may have, for instance, an uneven shape depending on the purpose. For example, grooves may be provided between protrusions 20 adjacent to each other.

(Protrusions)

The protrusions 20 extend in the y direction. The protrusions 20 are periodically arranged in the x direction. In other words, the plurality of protrusions 20 are periodically arranged in the direction perpendicular to the first direction in which the plurality of protrusions 20 extend. A pitch p between the neighboring protrusions 20 in the x direction is shorter than the wavelength of the light in the use band of the polarizing plate 100. For example, the pitch P is preferably 100 nm or more and 200 nm or less. If the pitch P is within this range, the protrusions 20 are easily made, and mechanical stability and stability of optical properties of the protrusions 20 are improved.

The pitch P between the neighboring protrusions 20 can be measured as an average value by a scanning electron microscope or a transmission electron microscope. For example, a distance between the neighboring protrusions 20 in the x direction may be measured at four random locations, and the pitch P obtained as an arithmetic mean thereof. A measurement method for averaging the measured values at four random locations among the plurality of the protrusions 20 is referred to as an electron microscopy method.

Here, a distance between upper ends of the neighboring protrusions 20 or a distance between the centers of the neighboring protrusions 20 in the x direction when the neighboring protrusions 20 are viewed on the xy plane is defined as the pitch P.

Hereinafter, a measurement method for averaging the measured values at four random locations using images observed by the scanning electron microscope or the transmission electron microscope is referred to as an electron microscopy method.

The protrusions 20 protrude from the substrate 10. A main direction in which the protrusions 20 protrude is the z direction. An average width of the protrusions 20 in the x direction is preferably 20% or more and 50% or less of the pitch P. Here, the average width of the protrusions 20 refers to an average value of widths at points at which each of the protrusions 20 are divided into groups of 10 in the z direction. A height of each of the protrusions 20 is preferably 250 nm or more and 400 nm or less. Further, an aspect ratio obtained by dividing the height of each of the protrusions 20 by the average width is preferably 5 or more and 13.3 or less.

In a case where the substrate 10 is an optically active crystal such as quartz, a direction parallel or perpendicular to an optical axis of the crystal is preferably aligned with the direction in which the protrusions 20 extend. Here, the optical axis is a directional axis on which a difference in refractive index between an ordinary ray O and an extraordinary ray E of light that travels in a direction of the optical axis is minimized. Optical properties can be improved by extending the protrusions 20 in the direction of the optical axis.

Each of the protrusions 20 has a reflective layer 30, a multilayer film 40, and an optical property improving layer 50. The protrusions 20 illustrated in FIG. 1 are laminated from an outer surface (a side distant from the substrate 10) in the order of the multilayer film 40, the optical property improving layer 50, and the reflective layer 30.

<Multilayer>

The multilayer film 40 is located at a position that is further away from the substrate 10 than the reflective layer 30 is. The multilayer film 40 illustrated in FIG. 1 has a dielectric layer 42, an absorption layer 44, and a second dielectric layer 46 from the vicinity of the substrate 10 in that order. The dielectric layer 42, the absorption layer 44, and the second dielectric layer 46 attenuate the polarized wave (the TE wave (the S wave)) reflected by the reflective layer 30 due to interference.

[Dielectric Layer]

The dielectric layer 42 illustrated in FIG. 1 is laminated on the optical property improving layer 50. The dielectric layer 42 does not necessarily need to be in contact with the optical property improving layer 50, and another layer may be present between the dielectric layer 42 and the optical property improving layer 50. The dielectric layer 42 extends in a band shape in the y direction. The dielectric layer 42 constitutes a part of the multilayer film 40.

A thickness of the dielectric layer 42 can be determined depending on a polarized wave reflected by the absorption layer 44. The thickness of the dielectric layer 42 is determined such that a phase of the polarized wave reflected by the absorption layer 44 and a phase of the polarized wave reflected by the reflective layer 30 are shifted by half a wavelength. To be specific, the thickness of the dielectric layer 42 is preferably 1 nm or more and 500 nm or less. If the thickness of the dielectric layer 42 is within this range, a relationship between the phases of the two reflected polarized waves can be adjusted, and an interference effect can be enhanced. The thickness of the dielectric layer 42 can be measured using the aforementioned electron microscopy method.

A metal oxide, magnesium fluoride ($MgF_2$), cryolite, germanium, silicon, boron nitride, carbon, or combinations thereof can be used as a material of the dielectric layer 42. Metal oxides include a Si oxide such as $SiO_2$, $Al_2O_3$, a beryllium oxide, a bismuth oxide, a boron oxide, a tantalum oxide, and so on. Among them, the Si oxide is preferably the material of the dielectric layer 42.

A refractive index of the dielectric layer 42 is preferably greater than 1.0 and smaller than or equal to 2.5. The optical properties of the reflective layer 30 are also influenced by a surrounding refractive index (e.g., the refractive index of the dielectric layer 42). The refractive index of the dielectric layer 42 is adjusted, and thereby polarization characteristics of the polarizing plate can be controlled.

[Absorption Layer]

The absorption layer 44 illustrated in FIG. 1 is laminated on the dielectric layer 42. The absorption layer 44 extends in a band shape in the y direction. The absorption layer 44 constitutes a part of the multilayer film 40.

A thickness of the absorption layer 44 is preferably, for instance, 10 nm or more and 100 nm or less. The thickness of the absorption layer 44 can be measured using the aforementioned electron microscopy method.

One or more materials having an optical absorption function in which an extinction constant which is an optical constant is not zero can be used as a material of the absorption layer 44. A metal material or a semiconductor material can be used for the absorption layer 44. The material used for the absorption layer 44 can be appropriately selected according to a wavelength range of light in the use band of the polarizing plate.

In a case where the metal material is used for the absorption layer 44, the metal material is preferably an alloy that contains an elemental metal such as Ta, Al, Ag, Cu, Au, Mo, Cr, Ti, W, Ni, Fe, Sn, or the like, or one or more elements thereof. Further, in a case where the semiconductor material is used for the absorption layer 44, the semiconductor material is preferably Si, Ge, Te, ZnO, a silicide, or the like. Examples of the silicide include $\beta$-$FeSi_2$, $MgSi_2$, $NiSi_2$, $BaSi_2$, $CrSi_2$, TaSi, and so on. The polarizing plate 100 in which these materials are used for the absorption layer 44 has a high extinction ratio with respect to the visible light range. Further, the absorption layer 44 particularly preferably includes Fe or Ta, and Si.

In the case where the semiconductor material is used for the absorption layer 44, a band-gap energy of a semiconductor contributes to an absorption action of light. For this reason, the band-gap energy of the semiconductor material is less than or equal to the value obtained by converting the wavelength in the use band into energy. For example, in a case where the use band is the visible light range, a semiconductor material having a band-gap energy of 3.1 eV or less with respect to the absorption energy at a wavelength of 400 nm or more is preferably used.

The absorption layer 44 is not limited to one layer and may be composed of two or more layers. In a case where the absorption layer 44 has two or more layers, materials of these layers may be different. The absorption layer 44 can be formed by a method such as vapor deposition, a sputtering method, or the like.

[Second Dielectric Layer]

The second dielectric layer 46 illustrated in FIG. 1 is laminated on the absorption layer 44. The second dielectric layer 46 extends in a band shape in the y direction. The second dielectric layer 46 constitutes a part of the multilayer film 40.

The same material as the aforementioned dielectric layer 42 can be used for the second dielectric layer 46. The second dielectric layer 46 may be formed of the same material as the dielectric layer 42 or a material different from that of the dielectric layer 42. The material of the second dielectric layer 46 is preferably a Si oxide. A refractive index of the second dielectric layer 46 is preferably within the same range as the aforementioned dielectric layer 42. A thickness of the second dielectric layer 46 is preferably, for instance, 10 nm or more and 100 nm or less. The thickness of the second dielectric layer 46 can be measured using the aforementioned electron microscopy method.

An example of the multilayer film 40 includes a combination of $SiO_2/FeSi/SiO_2$. $SiO_2$ is used as the dielectric layer 42 and the second dielectric layer 46, and FeSi is used as the absorption layer 44.

<Optical Property Improving Layer>

The optical property improving layer 50 is formed on an interface between the reflective layer 30 and the multilayer film 40. The optical property improving layer 50 extends in a band shape in the y direction.

The optical property improving layer 50 is an oxide layer formed of an oxide that contains a constituent element of which the reflective layer is composed. For example, in a case where the reflective layer 30 contains Al (e.g., in a case where the reflective layer 30 is a layer formed of Al), a material of which the optical property improving layer 50 is composed is an oxide containing Al (e.g., aluminum oxide). In a case where the reflective layer 30 contains Cu (e.g., in a case where the reflective layer 30 is a layer formed of Cu), the material of which the optical property improving layer 50 is composed is an oxide containing Cu (e.g., copper oxide).

A thickness of the optical property improving layer 50 may be greater than 0 nm, and is preferably 20 nm or less.

An etching rate of the optical property improving layer 50 with respect to a chlorine-based gas is higher than that of the multilayer film 40. The etching rate of the optical property improving layer 50 with respect to a chlorine-based gas is no less than 6.7 times and no more than 15 times the etching rate of the multilayer film 40. That is, an etching selectivity between the optical property improving layer 50 and the multilayer film 40 with respect to a chlorine-based gas becomes 6.7 or more and 15 or less. The etching selectivity is obtained by dividing the etching rate of the optical property improving layer 50 by the etching rate of the multilayer film 40.

If the etching selectivity between the optical property improving layer 50 and the multilayer film 40 with respect to a chlorine-based gas satisfies the above relationship, the optical properties of the polarizing plate 100 are improved. It is thought that excessive etching of the multilayer film 40 is inhibited in the etching when the optical property improving layer 50 and the reflective layer 30 are processed, and collapse of the shapes of the protrusions 20 is inhibited. Further, it is difficult for etching conditions to stabilize in an early stage of the etching when the reflective layer 30 is processed. It is thought that the optical properties of the polarizing plate 100 are improved if the optical property improving layer 50 is located between the reflective layer 30 and the multilayer film 40, and thus the reflective layer 30 becomes a desired shape.

In contrast, an etching rate of the optical property improving layer 50 with respect to a fluorine-based gas is preferably lower than that of the multilayer film 40. That is, the optical property improving layer 50 is preferably formed of a material having a lower etching rate than the multilayer film 40 with respect to the fluorine-based gas. To be specific, the etching rate of the optical property improving layer 50 is preferably set to no less than 0.22 times and no more than 0.39 times the etching rate of the multilayer film 40. In etching when the multilayer film 40 is processed, it is difficult to etch the optical property improving layer 50 at the same time, and the shapes of the protrusions 20 can be adjusted to a desired shape.

Here, the chlorine-based gas is a gas that contains chlorine as a constituent element. Examples of the chlorine-based gas include a gas mixture of $BCl_3$, $Cl_2$, and $N_2$, a gas mixture of $Cl_2$, $CCl_4$, and $N_2$, or the like. Further, the fluorine-based gas is a gas that contains fluorine as a constituent element. Examples of the fluorine-based gas include $CF_4$, $CHF_3$, $C_4F_8$, or the like.

<Reflective Layer>

The reflective layer 30 protrudes from the substrate 10 in the z direction, and extends in a band shape in the y direction. The reflective layer 30 is located between the substrate 10 and the multilayer film 40. A separate layer may be inserted between the substrate 10 and the reflective layer 30. The reflective layer 30 reflects a TE wave (an S wave) and transmits a TM wave (a P wave).

A material having reflectivity with respect to light having a wavelength in the use band can be used for the reflective layer 30. For example, an elementary metal such as Al, Ag, Cu, Mo, Cr, Ti, Ni, W, Fe, Si, Ge, Ta, or the like, or an alloy thereof can be used. Among them, Al, Cu, or an alloy thereof is preferably used. Further, the reflective layer 30 is not limited to a metal, and an inorganic film or a resin film in which a surface reflectivity is enhanced by, for instance, coloration can be used.

During design, there is a degree of freedom in terms of height of the reflective layer 30. For example, the height of the reflective layer 30 is preferably 100 nm or more and 300 nm or less. The height of the reflective layer 30 can be obtained from an electron microscopy method.

A width of the reflective layer 30 is preferably no less than 20% and no more than 50% of the pitch P. To be specific, the width of the reflective layer 30 is preferably 10 nm or more and 100 nm or less, and more preferably 20 nm or more and 50 nm or less.

The etching rate of the reflective layer 30 with respect to a chlorine-based gas is equal to that of the optical property improving layer 50.

When the reflective layer 30 and the optical property improving layer 50 satisfy the above relationship, the reflective layer 30 and the optical property improving layer 50 can be processed at the same time. Further, since the etching conditions of the reflective layer 30 and the optical property improving layer 50 can be made constant, the etching conditions can be further stabilized at the time when the reflective layer 30 is formed. As a result, a shape of the reflective layer 30 becomes a desired shape, and the optical properties of the polarizing plate 100 are improved.

Further, the etching rate of the reflective layer 30 with respect to a chlorine-based gas is preferably no less than 6.7 times and no more than 15 times the etching rate of the multilayer film 40. If the above relationship is satisfied, the multilayer film 40 can be inhibited from being excessively etched in the etching when the reflective layer 30 is processed, and the shapes of the protrusions 20 can be inhibited from being collapsed. As a result, the shapes of the protrusions 20 become desired shapes, and the optical properties of the polarizing plate 100 are improved.

Further, the etching rate of the reflective layer 30 with respect to a fluorine-based gas is preferably no less than 0.22 times and no more than 0.39 times the etching rate of the multilayer film 40. If the above relationship is satisfied, the reflective layer 30 can be inhibited from being excessively etched in the etching when the multilayer film 40 is processed. As a result, the shapes of the protrusions 20 become desired shapes, and the optical properties of the polarizing plate 100 are improved.

(Other Constitutions)

The polarizing plate 100 may have layers other than the above constitution.

For example, a diffusion barrier layer may be provided between the dielectric layer 42 and the absorption layer 44 or between the second dielectric layer 46 and the absorption layer 44. The diffusion barrier layer prevents diffusion of light at the absorption layer 44. A metal film formed of Ta, W, Nb, Ti, or the like may be used for the diffusion barrier layer.

Further, a protective film may be formed on an incident side of light of the polarizing plate 100. For example, in a case where light is incident from the +z direction toward the −z direction in FIG. 1, the protective film is formed to cover surroundings of the first surface 10a of the substrate 10 and the protrusions 20. The same material as the dielectric layer 42 can be used for the protective film. The protective film inhibits the metal film such as the reflective layer 30 from being oxidized more than necessary. The protective film can be formed using chemical vapor deposition (CVD), atomic layer deposition (ALD), or the like.

Further, a water repellent film may be formed on the incident side of light of the polarizing plate 100. For example, a fluorine-based silane compound such as perfluorodecyl trichlorosilane (FDTS) can be used for the water repellent film. The water repellent film can be formed using CVD, ALD, or the like. The water repellent film increases humidity resistance of the polarizing plate 100 and improves reliability of the polarizing plate 100.

As described above, the polarizing plate 100 according to the present embodiment has lower reflectivity and high transmittance. For this reason, the polarizing plate 100 can be used in various optical apparatuss.

[Optical Apparatus]

An optical apparatus according to a second embodiment includes the polarizing plate 100 according to the first embodiment. Examples of the optical apparatus may include a liquid crystal projector, a head-up display, a digital camera, and so on. The polarizing plate 100 according to the first embodiment has high transmittance of polarization in a direction of a transmission axis, and low reflectivity of polarization in a direction of an absorption axis. For this reason, the polarizing plate 100 can be used for various purposes. Further, the polarizing plate 100 is formed of an inorganic material. In comparison with an organic polarizing plate, the polarizing plate 100 is particularly suitably used in a liquid crystal projector, a head-up display, etc. for which heat resistance is required.

In a case where the optical apparatus includes a plurality of polarizing plates, at least one of the plurality of polarizing plates may be the polarizing plate 100 according to the first embodiment. For example, in a case where the optical apparatus is a liquid crystal projector, the polarizing plates are disposed on incident and outgoing sides of a liquid crystal panel. The polarizing plate 100 according to the first embodiment is used as one of these polarizing plates.

[Method of Manufacturing Polarizing Plate]

A method of manufacturing a polarizing plate according to a third embodiment has a first laminating process, a second laminating process, a layer forming process, a pattern forming process, a first processing process, and a second processing process. Hereinafter, an example of the method of manufacturing a polarizing plate according to the third embodiment will be specifically described using FIGS. 2 to 8.

Figure 2:
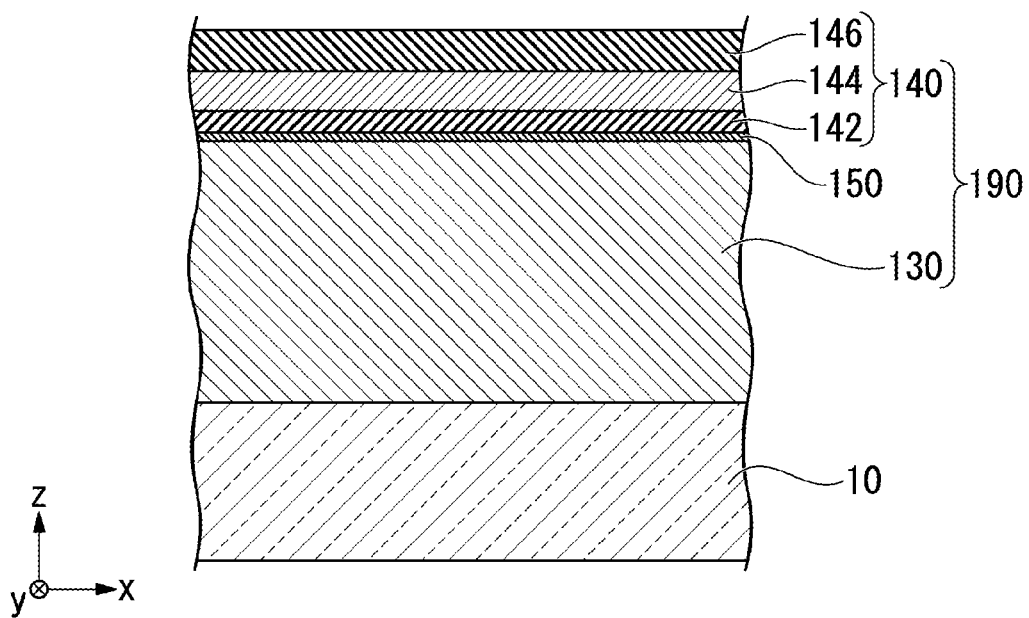
FIG. 2 is a cross-sectional schematic view illustrating a method of manufacturing a polarizing plate according to a third embodiment.

FIG. 2 is a cross-sectional schematic view for illustrating a method of manufacturing a polarizing plate according to a third embodiment.

First, in the first laminating process, a reflective layer 130 is laminated on a substrate 10. For example, Al is used for the reflective layer 130. The reflective layer 130 can be formed using, for instance, a sputtering method or a vapor deposition method. After being processed, the reflective layer 130 is a layer that becomes the reflective layer 30 illustrated in FIG. 1. The same material as the aforementioned reflective layer 30 is used for the reflective layer 130.

Next, in the layer forming process, the reflective layer 130 is heated in air. Due to the heating, a surface of the reflective layer 130 is oxidized, and an optical property improving layer 150 is formed. The optical property improving layer 150 is formed on the surface of the reflective layer 130 which is located on the side opposite to the substrate 10. The heating is preferably set to 100° C. or higher and 500° C. or lower. A thickness of the optical property improving layer 150 can be adjusted by a heating time, a heating temperature, and so on. Conditions (a heating time, a heating temperature, etc.) for oxidation treatment of the surface of the reflective layer 130 can be adjusted such that the optical property improving layer 150 has desired etching characteristics.

Next, in the second laminating process, a multilayer film 140 is laminated on the optical property improving layer 150. The multilayer film 140 is formed on a surface of the optical property improving layer 150 which is located on the side opposite to the reflective layer 130. A laminate 190 made up of the reflective layer 130, the optical property improving layer 150, and the multilayer film 140 is formed on the substrate 10. The multilayer film 140 is obtained by laminating a dielectric layer 142, an absorption layer 144, and a second dielectric layer 146 in turn. For example, $SiO_2$ (the dielectric layer 142), FeSi (the absorption layer 144), and $SiO_2$ (the second dielectric layer 146) are laminated in turn. These layers can be formed using, for instance, a sputtering method or a vapor deposition method.

After being processed, the multilayer film 140 is a layer that becomes the multilayer film 40 illustrated in FIG. 1. The same material as the aforementioned multilayer film 40 is used for the multilayer film 140.

Figure 3:
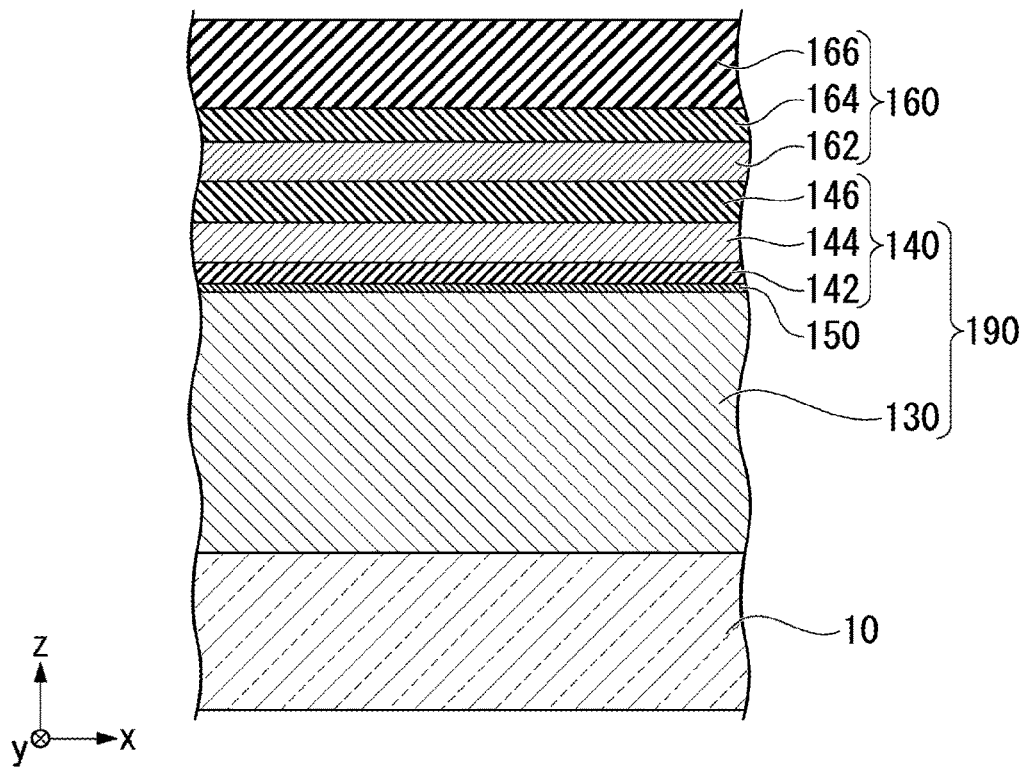
FIG. 3 is a cross-sectional schematic view for illustrating the method of manufacturing a polarizing plate according to the third embodiment.

FIG. 3 is a cross-sectional schematic view for illustrating the method of manufacturing a polarizing plate according to the third embodiment.

In the second laminating process, a mask layer 160 is laminated on a surface of the laminate 190 which is located on the side opposite to the substrate 10. The mask layer 160 illustrated in FIG. 3 has a three-layered structure of a first mask layer 162, a second mask layer 164, and a third mask layer 166.

The first mask layer 162 is a layer for processing the multilayer film 140. The multilayer film 140 is processed using a difference in etching rate between the first mask layer 162 and the multilayer film 140. The first mask layer 162 is formed of a material that has an etching rate different from that of the multilayer film 140 with respect to a prescribed gas. For example, the same material as the reflective layer 130 can be used for the first mask layer 162. As one example, Al is used for the first mask layer 162. The first mask layer 162 can be formed using a sputtering method or a vapor deposition method.

The second mask layer 164 is an anti-reflection film. The second mask layer 164 prevents light, which exposes the third mask layer 166 composed of a resist, from being reflected to become return light due to the first mask layer 162. The return light reduces processing accuracy of the third mask layer 166. A coating film of an organic substance can be used for the second mask layer 164. For example, SWK-EX4PE available from TOKYO OHKA KOGYO Co., Ltd. can be used. The second mask layer 164 can be formed by a method of coating the second mask layer by spin coating, and then heating and firing the second mask layer.

The third mask layer 166 is a resist. For example, TDUR-P3262EM available from TOKYO OHKA KOGYO Co., Ltd. can be used. The third mask layer 166 is formed to process the first mask layer 162 and the second mask layer 164. The third mask layer 166 can be formed by a well-known method such as spin coating.

Figure 4:
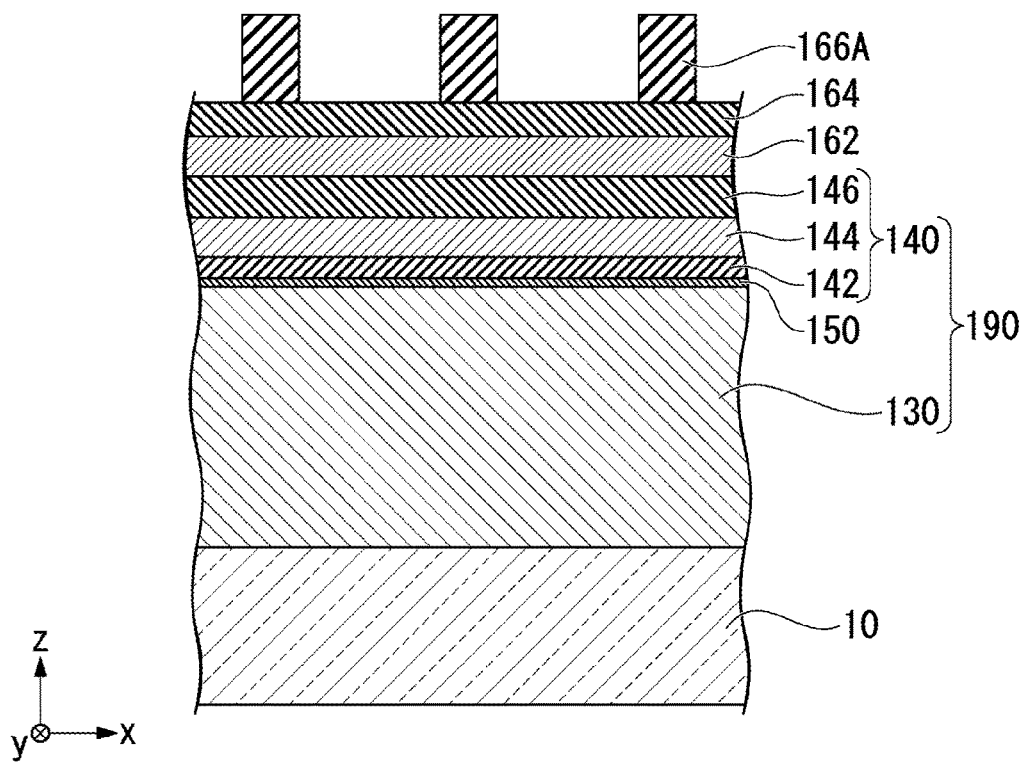
FIG. 4 is a cross-sectional schematic view for illustrating a pattern forming process in the method of manufacturing a polarizing plate according to the third embodiment.
Figure 5:
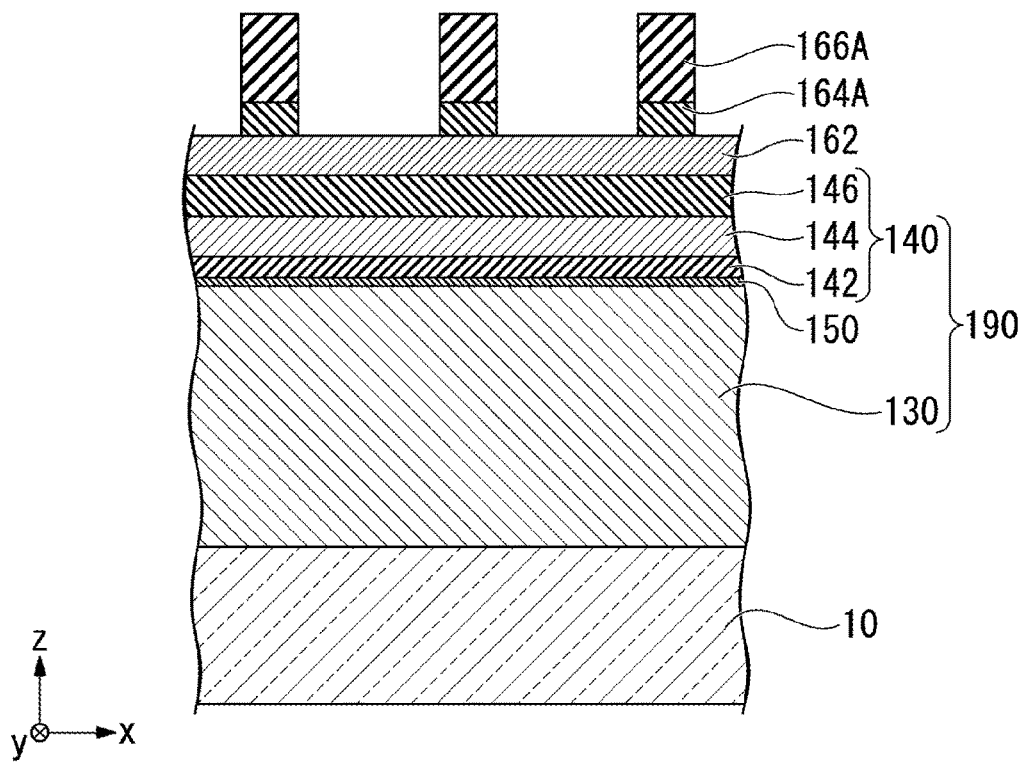
FIG. 5 is a cross-sectional schematic view for illustrating a pattern forming process in the method of manufacturing a polarizing plate according to the third embodiment.
Figure 6:
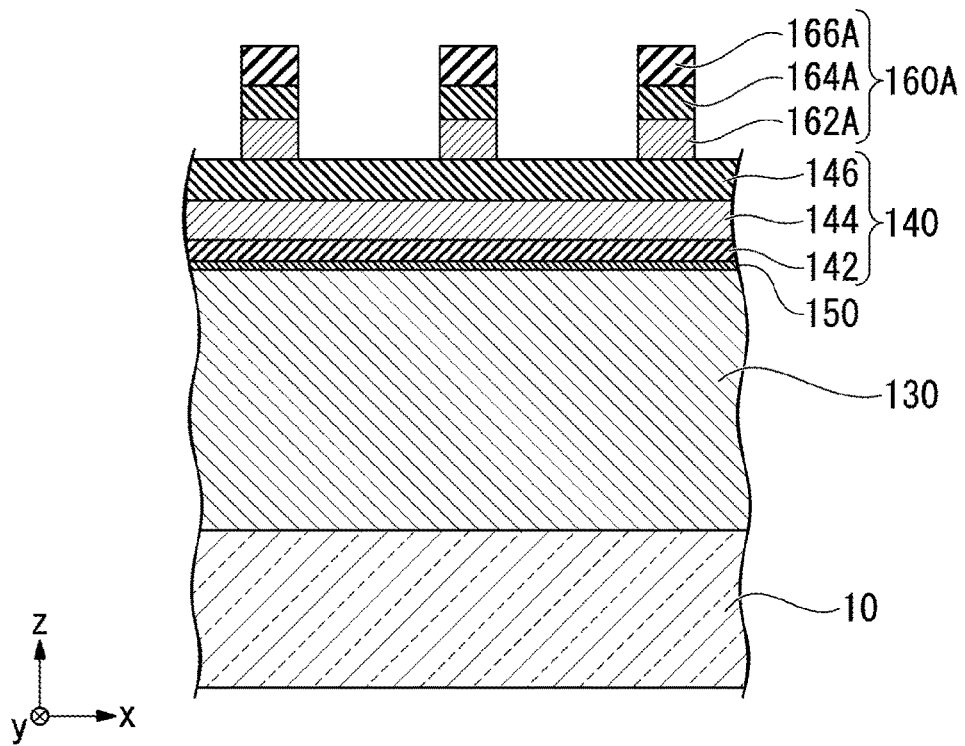
FIG. 6 is a cross-sectional schematic view for illustrating a pattern forming process in the method of manufacturing a polarizing plate according to the third embodiment.

FIGS. 4 to 6 are cross-sectional schematic views for illustrating a pattern forming process in the method of manufacturing a polarizing plate according to the third embodiment. First, as illustrated in FIG. 4, a pattern is formed on the third mask layer 166. The third mask layer 166 is patterned using a photolithography method. The third mask layer 166 becomes a third mask pattern 166A.

Next, as illustrated in FIG. 5, the second mask layer 164 is processed using the third mask pattern 166A as a mask. The second mask layer 164 is processed by etching. Dry etching using a mixed gas of $O_2$ and Ar is preferably used as the etching.

An etching rate of the second mask layer 164 with respect to the mixed gas of $O_2$ and Ar is preferably set to no less than 10 times an etching rate of the first mask layer 162. The etching rate can be adjusted by changing a material of a layer to be processed, a type of a gas, a flow rate of a gas, a pressure of a gas, an output voltage for generating ions or radicals, and so on.

Only the second mask layer 164 can be patterned while inhibiting a change in the shape of the first mask layer 162. The second mask layer 164 becomes a second mask pattern 164A.

Next, as illustrated in FIG. 6, the first mask layer 162 is processed using the second mask pattern 164A and the third mask pattern 166A as masks. The first mask layer 162 is processed by etching. Dry etching using a chlorine-based gas is preferably used as the etching. A mixed gas of $BCl_3$, $Cl_2$ and $N_2$ is preferably used as the chlorine-based gas, and a flow rate ratio thereof is preferably set in such a manner that $BCl_3$ is set to 16 to 30 sccm, $Cl_2$ is set to 8 to 17 sccm, and $N_2$ is set to 2 to 18 sccm.

The etching rate of the first mask layer 162 with respect to the chlorine-based gas is preferably set to no less than 6.7 times and no more than 15 times the etching rate of the multilayer film 140. Only the first mask layer 162 can be patterned while inhibiting a change in the shape of the multilayer film 140. The first mask layer 162 becomes a first mask pattern 162A.

As described above, the mask layer 160 is processed in the three steps, and thereby a high-accuracy mask pattern 160A is formed.

Figure 7:
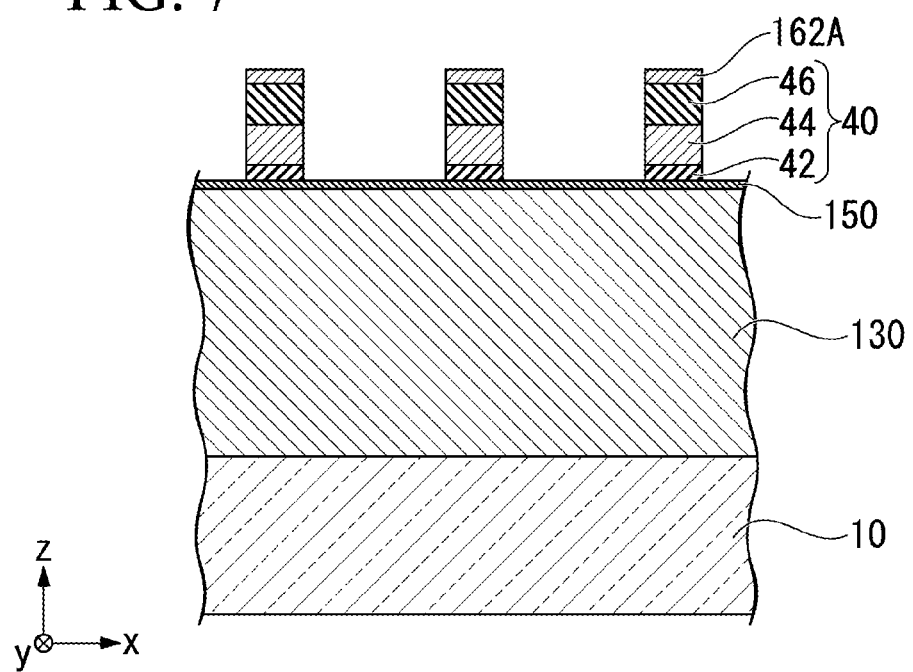
FIG. 7 is a cross-sectional schematic view for illustrating a first processing process in the method of manufacturing a polarizing plate according to the third embodiment.

FIG. 7 is a cross-sectional schematic view for illustrating a first processing process in the method of manufacturing a polarizing plate according to the third embodiment. The first processing process processes the multilayer film 140 via the formed mask pattern 160A.

The first processing process is preferably performed with a fluorine-based gas. The dielectric layer 142, the absorption layer 144, and the second dielectric layer 146, which constitute the multilayer film 140, show substantially the same etching rate with respect to the fluorine-based gas. The fluorine-based gas is used, and thereby the multilayer film 140 can be processed at a time.

Etching rates of the optical property improving layer 150 and the reflective layer 130 with respect to the fluorine-based gas is preferably set to no less than 0.22 times and no more than 0.39 times an etching rate of the multilayer film 140. The multilayer film 140 can be processed while almost not processing the optical property improving layer 150 and the reflective layer 130. The multilayer film 140 is processed to become the multilayer film 40 made up of the dielectric layer 42, the absorption layer 44, and the second dielectric layer 46.

The mask pattern 160A is removed by etching using a fluorine-based gas. As illustrated in FIG. 7, the first mask pattern 162A may also remain in part. The first mask pattern 162A is removed in the next process.

Finally, the second processing process is performed. The second processing process processes the optical property improving layer 150 and the reflective layer 130 using the multilayer film 40 as a mask. The reflective layer 130 becomes the reflective layer 30 by means of etching, and the polarizing plate 100 illustrated in FIG. 1 is obtained.

Etching conditions may not be stable in the early stage of etching. The optical property improving layer 150 is provided, and thereby the etching conditions when the reflective layer 130 is processed can be stabilized. Since incident light is reflected by the reflective layer 130, the reflective layer 130 is formed in a desired shape, and optical properties of the polarizing plate 100 are improved.

The second processing process is performed using a chlorine-based gas. An etching rate of the optical property improving layer 150 with respect to the chlorine-based gas is preferably set to no less than 6.7 times and no more than 15 times an etching rate of the multilayer film 40. Further, an etching rate of the reflective layer 130 with respect to the chlorine-based gas is preferably set to no less than 6.7 times and no more than 15 times the etching rate of the multilayer film 40. When the optical property improving layer 150 and the reflective layer 130 are processed, excessive etching of the multilayer film 40 and the optical property improving layer 50 is avoided.

As described above, according to the method of manufacturing a polarizing plate according to the present embodiment, when a prescribed layer is processed by etching, an influence on the other layers can be reduced. As a result, the protrusions 20 having desired shapes can be made, and the polarizing plate 100 having excellent optical properties can be obtained.

As described above, the preferred embodiment of the present invention has been described in detail. However, the present invention is not limited to the specified embodiment and can be variously modified and changed without departing from the subject matter of the present invention which is described in the scope of the claim.

EXAMPLES

Example 1

Alkali-free glass (Eagle XG available from Corning Inc.) was prepared as the substrate 10. Al having a thickness of 250 nm (a reflective layer 130) was laminated on the alkali-free glass using a sputtering method. Next, the reflective layer 130 was heated at 300° C., and an optical property improving layer 150 was made (see FIG. 2). A thickness of the optical property improving layer was 5 nm.

Next, $SiO_2$ (a dielectric layer 142), FeSi (an absorption layer 144), and $SiO_2$ (a second dielectric layer 146) were laminated on the reflective layer in that order. These layers were laminated using a sputtering method. A thickness of the dielectric layer 142 was set to 5 nm, a thickness of the absorption layer 144 was set to 35 nm, and a thickness of the second dielectric layer 146 was set to 60 nm. In this way, a laminate 190 made up of the reflective layer 130, the optical property improving layer 150, and a multilayer film 140 was made on the substrate 10 (see FIG. 2).

Al (a first mask layer 162), an anti-reflection film (a second mask layer 164), and a resist (a third mask layer 166), which acted as a mask layer 160, were laminated on the laminate 190 in turn (see FIG. 3). The anti-reflection film was used as a BARC. A thickness of the first mask layer 162 was set to 60 nm, a thickness of the second mask layer 164 was set to 30 nm, and a thickness of the third mask layer 166 was set to 130 nm.

A pattern was formed on the resist, which was the third mask layer 166, using a photolithography method (see FIG. 5). The pattern was used as a line-and-space pattern. A pitch between the neighboring lines was set to 140 nm, and a shortest distance between the line and the line was set to 110 nm.

A pattern was formed on the second mask layer 164 using the patterned resist as a mask (see FIG. 6). The second mask layer 164 was etched under conditions that APC press was 0.5 Pa and bias RF power was 50 W using a dry etching apparatus (NE-5700 available from ULVAC Inc.). The APC press was a pressure during etching, and the bias RF power was an applied voltage at a bias side. An etching gas was used as a mixed gas of Ar and $O_2$, and a ratio between Ar and $O_2$ was set to 5:1. An etching rate of the second mask layer 164 on the conditions was 1 nm/sec, and an etching rate of the first mask layer 162 was 0.1 nm/sec. That is, the etching rate of the second mask layer 164 was 10 times the etching rate of the first mask layer 162.

A pattern was formed on the first mask layer 162 using a third mask pattern 166A and a second mask pattern 164A as masks (see FIG. 6). The first mask layer 162 was etched under conditions that APC press was 0.5 Pa and bias RF power was 50 W using a dry etching apparatus (NE-5700 available from ULVAC Inc.). An etching gas was a mixed gas of $N_2$, $BCl_3$ and $Cl_2$, and a ratio of $N_2$, $BCl_3$ and $Cl_2$ was set to 2:16.5:30. The etching rate of the first mask layer 162 on the conditions was 2 to 3 nm/sec, and an etching rate of the second dielectric layer 146 was 0.2 to 0.3 nm/sec. That is, the etching rate of the first mask layer 162 was within a range of 6.7 times to 15 times the etching rate of the second dielectric layer 146.

The multilayer film 140 was processed using the made mask pattern 160A as a mask (see FIG. 7). The multilayer film 140 was etched under conditions that APC press was 0.5 Pa and bias RF power was 60 W using a dry etching apparatus (NE-5700 available from ULVAC Inc.). An etching gas was a mixed gas of Ar and $CF_4$, and a ratio between Ar and $CF_4$ was set to 1:4. An etching rate of the multilayer film 140 on the conditions was 1.8 to 2.3 nm/sec, and etching rates of the optical property improving layer 150 and the reflective layer 130 were 0.5 to 0.7 nm/sec. That is, the etching rates of the optical property improving layer 150 and the reflective layer 130 were within a range of 0.22 times to 0.39 times the etching rate of the multilayer film 140.

Finally, the reflective layer 130 and the optical property improving layer 150 were processed (see FIG. 1). The reflective layer 130 and the optical property improving layer 150 were etched under conditions that APC press was 0.5 Pa and bias RF power was 50 W using a dry etching apparatus (NE-5700 available from ULVAC Inc.). An etching gas was a mixed gas of $N_2$, $BCl_3$ and $Cl_2$, and a ratio of $N_2$, $BCl_3$ and $Cl_2$ was set to 9:4:8. The etching rates of the reflective layer 130 and the optical property improving layer 150 on the conditions were 2 to 3 nm/sec, and the etching rate of the multilayer film 140 was 0.2 to 0.3 nm/sec. That is, the etching rates of the reflective layer 130 and the optical property improving layer 150 were within a range of 6.7 times to 15 times the etching rates of the multilayer film 140 and the optical property improving layer 150.

The manufacturing conditions of Example 1 are arranged in Table 1 below.

TABLE 1

| Treatment contents | | | Second mask layer etching conditions | First mask layer etching conditions | Multilayer film etching conditions | Reflective layer etching conditions |
|---|---|---|---|---|---|---|
| Etching conditions | | | $O_2$&Ar | Chlorine-based gas | Fluorine-based gas | Chlorine-based gas |
| APC press | | Pa | 0.5 | 0.5 | 0.5 | 0.5 |
| | Ar | | 5 | 0.0 | 1 | 0.0 |
| | $O_2$ | | 1 | 0.0 | 0.0 | 0.0 |
| | $CF_4$ | | 0.0 | 0.0 | 4 | 0.0 |
| | $N_2$ | | 0.0 | 2.0 | 0.0 | 9 |
| | $BCl_3$ | | 0.0 | 16.5 | 0.0 | 4 |
| | $Cl_2$ | | 0.0 | 30.0 | 0.0 | 8 |
| Bias | | W | 50 | 50 | 50 | 50 |

TABLE 1-continued

|  |  | Second mask layer etching conditions | First mask layer etching conditions | Multilayer film etching conditions | Reflective layer etching conditions |
|---|---|---|---|---|---|
| Treatment contents |  |  |  |  |  |
| Etching rate of each layer |  |  |  |  |  |
| Second mask layer | nm/sec | 1.0 | 2.0 | 2.0 | 2.0 |
| Third mask layer |  |  |  |  |  |
| First mask layer | nm/sec | 0.1 | 2.0 to 3.0 | 0.5 to 0.7 | 0.2 to 0.3 |
| Reflective layer |  |  |  |  |  |
| Dielectric layer | nm/sec | 0.1 | 0.2 to 0.3 | 1.8 to 2.3 | 0.2 to 0.3 |
| Second dielectric layer |  |  |  |  |  |
| Absorption layer | nm/sec | 0.1 | 0.2 to 0.3 | 1.8 to 2.3 | 0.2 to 0.3 |
| Etching selectivity of reflective layer |  |  |  |  |  |
| Second mask layer |  | 0.1 | 1.0 to 1.5 | 0.25 to 0.35 | 1.0 to 1.5 |
| Third mask layer |  |  |  |  |  |
| First mask layer |  | 1.0 | 1.0 | 1.0 | 1.0 |
| Dielectric layer |  | 1.0 | 6.7 to 15.0 | 0.22 to 0.39 | 6.7 to 15.0 |
| Second dielectric layer |  |  |  |  |  |
| Absorption layer |  | 1.0 | 6.7 to 15.0 | 0.22 to 0.39 | 6.7 to 15.0 |

The components of the polarizing plate of Example 1 are summarized below.

Substrate, which was made of alkali-free glass (Eagle XG available from Corning Inc.), and in which protrusions having a height of 20 nm were provided on the surface thereof and were located below the reflective layer, Protrusions, which had a pitch of 140 nm and in which the distance between the neighboring protrusions was 105 nm, Reflective layer, which was formed of Al, and had a width of 35 nm and a thickness of 250 nm, Optical property improving layer, which was formed of $Al_2O_3$, and had a width of 35 nm and a thickness of 5 nm, Dielectric layer, which was formed of $SiO_2$, and had a width of 35 nm and a thickness of 5 nm, Absorption layer, which was formed of Fe (5 atm %) and Si (95 atm %), and had a width of 35 nm and a thickness of 35 nm, and Second dielectric layer, which was formed of $SiO_2$, and had a width of 35 nm and a thickness of 30 nm.

Examples 2 to 4 and Comparative Example 1

Examples 2 to 4 and Comparative Example 1 are different from Example 1 in that the thickness of the optical property improving layer is changed by changing the conditions when the optical property improving layer is formed. The thickness of the optical property improving layer was 10 nm in Example 2, 20 nm in Example 3, 30 nm in Example 3, and 0 nm in Comparative Example 1.

Figure 8A:
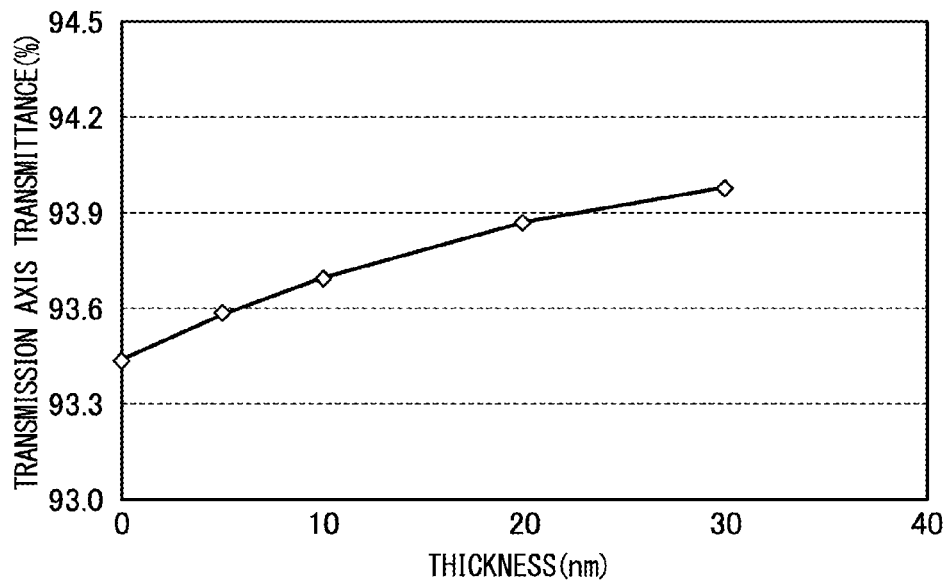
FIG. 8A illustrates results of measuring transmission axis transmittance of the polarizing plate in Examples 1 to 4 and Comparative Example 1.
Figure 8B:
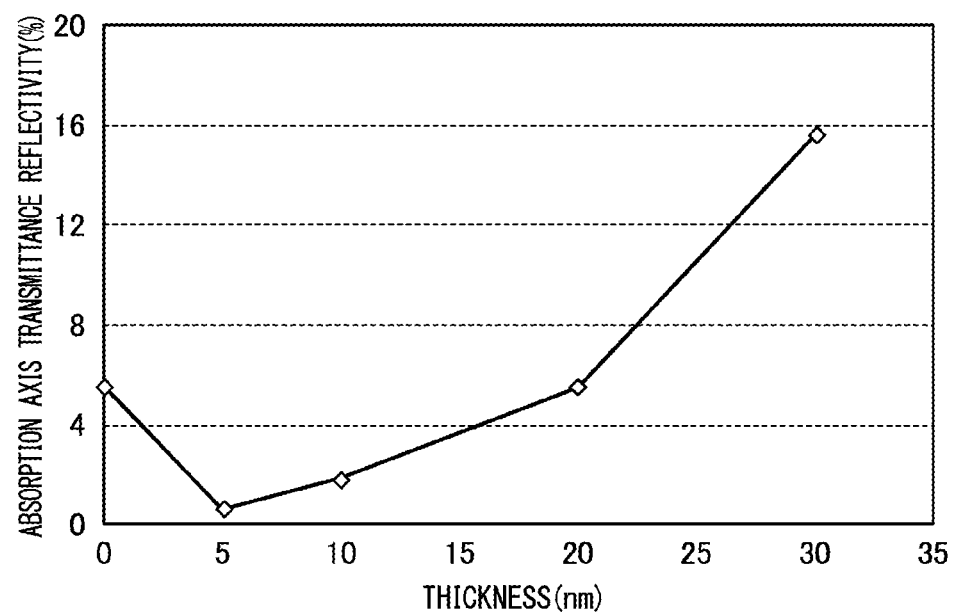
FIG. 8B illustrates results of measuring absorption axis transmittance of the polarizing plate in Examples 1 to 4 and Comparative Example 1.

FIG. 8 illustrates results of measuring transmission axis transmittance and absorption axis transmittance of the polarizing plate in Examples 1 to 4 and Comparative Example 1. FIG. 8A illustrates the result of the transmission axis transmittance, and FIG. 8B illustrates the result of the absorption axis transmittance. Any of Examples 1 to 4 was improved in transmission axis transmittance, compared to Comparative Example 1. Especially, when the thickness of the optical property improving layer was within a range of more than 0 nm and no more than 20 nm, the absorption axis reflectivity was reduced.

REFERENCE SIGNS LIST

10 Substrate
10a First surface
20 Ridge
30, 130 Reflective layer
40, 140 Multilayer film
42, 142 Dielectric layer
44, 144 Absorption layer
46, 146 Second dielectric layer
50, 150 Optical property improving layer
100 Polarizing plate
160 Mask layer
160A Mask pattern
162 First mask layer
162A First mask pattern
164 Second mask layer
164A Second mask pattern
166 Third mask layer
166A Third mask pattern
190 Laminate

The invention claimed is:

1. A polarizing plate having a wire grid structure comprising:
    a transparent substrate; and
    a plurality of protrusions configured to extend in a first direction on the transparent substrate, and periodically arranged at a pitch shorter than a wavelength of light in a use band,
    wherein each of the protrusions includes a reflective layer, a multilayer film, and an optical property improving layer located between the reflective layer and the multilayer film,
    the multilayer film is formed of a dielectric layer, an absorption layer and a second dielectric layer from the vicinity of the transparent substrate in that order,
    the optical property improving layer is formed of an oxide that contains a constituent element of which the reflective layer is composed, in which the oxide is different from the material of the dielectric layer, and
    the optical property improving layer is formed of a material whose etching rate with respect to a chlorine-based gas method is no less than 6.7 times and no more than 15 times an etching rate of the material of the multilayer film with respect to the same chlorine-based gas method, and
    wherein the dielectric layer is in contact with the optical property improving layer.

2. The polarizing plate according to claim 1, wherein the optical property improving layer is formed of a material whose etching rate with respect to a fluorine-based gas method is lower than the etching rate of the material of the multilayer film with respect to the same fluorine-based gas method.

3. The polarizing plate according to claim 1, wherein:
the reflective layer is formed of Al or Cu; and
in a case where the reflective layer is formed of Al, the optical property improving layer is composed of an oxide containing Al, and in a case where the reflective layer is formed of Cu, the optical property improving layer is composed of an oxide containing Cu.

4. An optical apparatus comprising a liquid crystal panel and two polarizing plates having a wire grid structure, wherein at least one of the two polarizing plates comprises:
a transparent substrate; and
a plurality of protrusions configured to extend in a first direction on the transparent substrate, and periodically arranged at a pitch shorter than a wavelength of light in a use band, wherein each of the protrusions includes a reflective layer, a multilayer film, and an optical property improving layer located between the reflective layer and the multilayer film,
the multilayer film is formed of a dielectric layer, an absorption layer and a second dielectric layer from the vicinity of the transparent substrate in that order,
the optical property improving layer is formed of an oxide that contains a constituent element of which the reflective layer is composed, in which the oxide is different from the material of the dielectric layer, and
the optical property improving layer is formed of a material whose etching rate with respect to a chlorine-based gas method is no less than 6.7 times and no more than 15 times an etching rate of the material of the multilayer film with respect to the same chlorine-based gas method, wherein the dielectric layer is in contact with the optical property improving layer and wherein the polarizing plates are disposed on incident and outgoing sides of the liquid crystal panel.

* * * * *